UNITED STATES PATENT OFFICE.

RICHARD LINDE, OF BERLIN, GERMANY.

PASTE FOR ELECTRIC ACCUMULATORS.

SPECIFICATION forming part of Letters Patent No. 578,887, dated March 16, 1897.

Application filed February 24, 1896. Serial No. 580,560. (Specimens.)

*To all whom it may concern:*

Be it known that I, RICHARD LINDE, electrician, a subject of the German Emperor, and a resident of Berlin, German Empire, have invented certain new and useful Improvements in Producing the Paste for Electric Accumulators, of which the following is a specification.

This invention relates to the composition of the filling-paste for electric accumulators; and its object is to provide means for more effectively binding together the particles of lead oxids of which such paste is composed. Hitherto several attempts have been made to discover suitable binding materials for this purpose, for example, tar or oil varnish, has been used; but these adhesive materials not only add to the internal resistance, but in the alterations of the paste due to the charging and discharging they soon become loose and the paste falls to pieces. Other organic bodies among the fatty acids or alcohols have also been used. These form organic combinations with the lead and for a time hold the paste together and are electrically conductive, but in time these bodies become decomposed by the nascent oxygen forming carbonic acid and carbonic oxid. If, for example, glycerin with its chemical formula $C_3H_8O_3$ or its derivatives are used, lead glycerates or more complicated combinations of glycerin will be produced. The electrolytical oxidation will convert the glycerin into carbonic oxid, (CO,) carbonic acid, ($CO_2$,) and trioxymethylene, the latter of which will be further converted into carbonic acid, carbonic oxid, and water.

This invention consists in using the family of so-called "bitter principles," of which the principal is, perhaps, aloin, either in solution in water or in alcohol or ether. This family comprises the following substances: aloin, anemonin, asobotoxin, athamantin, betulin, cantharidin, caspaicin, cardol, carotin, chrysophanin, columbin, cornin, cotoin, cubebin, gantisin, ilixanthin, ivain, lactucin, laserpitin, ligustron, mangostin, olivin, pachymose, physalin, pikrolichenin, quassin, santonin, scoparin, scrophularin, smilacin, and viscin. The following may also be used, but owing to their poisonous qualities they are not to be preferred to the foregoing, namely, axiol, baphiin, caryophylin, gardenin, limonin, pikrotoxin, tulucinin. Such bitter principles when mixed with lead oxids hold the paste firmly and durably together. Their effect is due to their forming with the lead oxids insoluble, or at least almost insoluble, salts, of which the formula $C_{15}H_{16}O_7 + xPbO$ is a type. These salts connect the powdered particles of the paste and are not decomposed by oxidation during charging, but form oxid acids, which also keep the lead salts together and are electrically conductive.

For example, aloin passes by oxidation into eloexantine $C_5H_{10}O_6$. Botuline ($C_{36}H_{60}O_3$) is converted into the botuline acid, ($C_{36}H_{54}O_6$.)

The process consists in kneading the lead oxids with the solution of the bitter principle, putting the kneaded paste into the appropriate carriers, wherein it is allowed to dry, by which the chemical process is thus completed.

I claim as my invention—

1. In a filling-paste for electric accumulators the combination of the lead oxids with a bitter principle for the purpose set forth.

2. In a filling-paste for electric accumulators the combination of the lead oxids with aloin for the purpose set forth.

In testimony whereof I have signed this specification in the presence of two subscribing witnesses.

RICHARD LINDE.

Witnesses:
W. HAUPT,
HENRY HASPER.